United States Patent
Ohta

(10) Patent No.: US 11,964,330 B2
(45) Date of Patent: Apr. 23, 2024

(54) LATHE

(71) Applicant: STAR MICRONICS CO., LTD., Shizuoka (JP)

(72) Inventor: Rui Ohta, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 0 days.

(21) Appl. No.: 17/703,234

(22) Filed: Mar. 24, 2022

(65) Prior Publication Data
US 2022/0314331 A1    Oct. 6, 2022

(30) Foreign Application Priority Data

Mar. 31, 2021 (JP) ................. 2021-059597

(51) Int. Cl.
*B23B 3/06* (2006.01)
*B23Q 39/02* (2006.01)

(52) U.S. Cl.
CPC .............. *B23B 3/06* (2013.01); *B23Q 39/024* (2013.01)

(58) Field of Classification Search
CPC .......... B23B 3/16; B23B 3/161; B23B 3/164; B23B 3/32; B23B 3/30; B23B 13/04; B23B 29/24; B23B 29/244; B23B 29/248; B23B 9/242; B23Q 39/044; B23Q 2039/002; B23Q 2039/004; B23Q 2039/008

See application file for complete search history.

(56) References Cited

U.S. PATENT DOCUMENTS

| | | | | |
|---|---|---|---|---|
| 3,786,539 A | * | 1/1974 | Foll | B23Q 39/02 29/27 R |
| 4,597,155 A | * | 7/1986 | Garnett | B23Q 7/045 408/35 |
| 4,612,832 A | * | 9/1986 | Ushigoe | B23B 3/167 82/129 |
| 5,031,490 A | * | 7/1991 | Grossmann | B23Q 39/048 82/124 |
| 5,239,479 A | * | 8/1993 | Nolting | G05B 19/18 700/174 |

(Continued)

FOREIGN PATENT DOCUMENTS

| | | |
|---|---|---|
| DE | 102016201852 A1 | 8/2016 |
| EP | 1726387 A1 | 11/2006 |

(Continued)

*Primary Examiner* — Nicole N Ramos
(74) *Attorney, Agent, or Firm* — MUNCY, GEISSLER, OLDS & LOWE, P.C.

(57) ABSTRACT

An NC lathe including a first spindle, a second spindle capable of holding a cut-off workpiece delivered from the first spindle, a second tool post on which a plurality of tools are attachable to machine the workpiece held by the second spindle, a product receiver provided on the second tool post, a Y2-axis motor capable of moving at least one of the second tool post and the second spindle in a Y2-axis direction, and an X2-axis motor capable of moving at least one of the second tool post and the second spindle in an X2-axis direction. The second tool post has a plurality of tool mounting parts where the tools are attachable. The tool mounting parts are aligned at intervals in the Y2-axis direction. At least one of the tool mounting parts is arranged in a position overlapping the product receiver with respect to the X2-axis direction.

16 Claims, 8 Drawing Sheets

(56) References Cited

U.S. PATENT DOCUMENTS

| | | | | |
|---|---|---|---|---|
| 5,367,754 | A * | 11/1994 | Sheehan | B23Q 1/015 82/158 |
| 6,904,665 | B2 * | 6/2005 | Walz | B23Q 7/045 198/377.07 |
| 7,249,545 | B2 * | 7/2007 | Shinohara | B23Q 39/048 82/1.11 |
| 8,875,604 | B2 * | 11/2014 | Tsuyusaki | B23B 29/26 82/121 |
| 9,095,954 | B2 * | 8/2015 | Hessbrueggen | B24B 19/12 |
| 9,724,760 | B2 * | 8/2017 | Kawasumi | B23B 3/167 |
| 10,099,293 | B2 * | 10/2018 | Theurillat | B23B 3/065 |
| 10,773,313 | B2 * | 9/2020 | Kijima | G05B 19/402 |
| 10,786,882 | B2 * | 9/2020 | Passerini | B23Q 16/105 |
| 2007/0068350 | A1 * | 3/2007 | Kawasumi | B23B 3/167 82/121 |
| 2016/0229013 | A1 | 8/2016 | Komine et al. | |

FOREIGN PATENT DOCUMENTS

| | | |
|---|---|---|
| EP | 2692465 A1 | 2/2014 |
| JP | S62159241 U | 10/1987 |
| JP | H-10109251 A | 4/1998 |

* cited by examiner

LATHE

CROSS-REFERENCE TO RELATED APPLICATIONS

This application claims priority of Japanese Patent Application No. 2021-059597 filed on Mar. 31, 2021. The contents of this application are incorporated herein by reference in their entirety.

BACKGROUND OF THE INVENTION

The present invention relates to a lathe provided with a first spindle rotatable on a first spindle axis and a second spindle rotatable on a second spindle axis and capable of holding a workpiece delivered from the first spindle.

A well-known lathe is provided with a rotatable spindle capable of holding a workpiece and a first tool post where a tool is attachable, the tool being capable of machining one end of the workpiece held by the spindle, a chucking apparatus capable of chucking the workpiece whose one end has been machined, and a second tool post where a tool is attachable, the tool being capable of machining the other end of the workpiece chucked by the chucking apparatus. See Japanese Unexamined Utility Model Application Publication No. S62-159241. The plural kinds of tools are attached to the first tool post for the plural kinds of operations. The plural kinds of tools are attached to the second tool post for the plural kinds of operations. There is an increasing need for high-mix low-volume production, which increases a need for further more kinds of tools to be attached to the second tool post.

SUMMARY

Japanese Unexamined Utility Model Application Publication No. S62-159241 discloses the second tool post where the tools are attached side by side. Increasing the number of the tools attachable to the second tool post would increase the size of the second tool post. This would expand a moving range of the chucking apparatus for the increased tools arranged side by side. This would finally increase the size of the entire lathe with respect to the direction that the tools are attached. A functional member is generally attached to the second tool post in a position aligned with the tools. The functional member includes a product receiver capable of receiving a machined workpiece from the chucking apparatus. This would further increase the size of the second tool post and further expand the moving range of the chucking apparatus to enable the chucked workpiece to be delivered to the functional member. This would further increase the size of the entire lathe with respect to the direction that the tools are attached.

The present invention relates to a technology capable of providing a downsized lathe.

A lathe of the invention includes a first spindle rotatable on a first spindle axis; a second spindle rotatable on a second spindle axis and capable of holding a workpiece delivered from the first spindle; a tool post on which a plurality of tools are attachable, the tools being capable of machining the workpiece held by the second spindle; a functional member provided on the tool post; a first driver capable of moving at least one of the tool post and the second spindle in a first axis direction perpendicular to a direction of the second spindle axis along the second spindle axis; and a second driver capable of moving at least one of the tool post and the second spindle in a second axis direction perpendicular to the direction of the second spindle axis and also perpendicular to the first axis direction. The tool post has a plurality of mounting parts where the tools are attachable. The mounting parts are aligned at intervals in the first axis direction. At least one of the mounting parts is arranged in a position overlapping the functional member with respect to the second axis direction.

The lathe of the invention provides selection of one of the tools attached to the tool post by movement of at least one of the tool post and the second spindle in the second axis direction and by movement of at least one of the tool post and the second spindle in the first axis direction. The lathe of the invention provides at least one of the tool mounting parts arranged in a position overlapping the functional member with respect to the second axis direction. This can shorten the length of the tool post with respect to the second axis direction. The lathe of the invention provides the relative positions of the tool post and the second spindle with respect to the second axis direction for when machining the workpiece with the tool attached to the tool mounting part overlapping or close to that for when using the functional member. This can further reduce the moving range of one or both of the tool post and the second spindle in the second axis direction. All the features described above contribute to downsizing the lathe.

At least one of the tool mounting parts may be arranged in a position overlapping part of the functional member with respect to the second axis direction and separate from the part of the functional member with respect to the first axis direction. A tool attachment unit holding the tool may be attached to each tool mounting part of the tool post. At least one of the tool attachment units may be arranged in a position overlapping with the functional member with respect to the second axis direction. At least one of the tool attachment units may be arranged in a position overlapping with part of the functional member with respect to the second axis direction and separate from the part of the functional member with respect to the first axis direction. The functional member may include a product receiver as described later, a measuring apparatus capable of measuring a shape of a workpiece, a robot arm capable of receiving a machined workpiece, and a brakage detector capable of detecting breakage of the tool. The functional member may be used before or after machining. The functional member may be anything having no function related to a workpiece machining.

The first driver may be a driver capable of moving the tool post.

The functional member may face the second spindle with respect to the direction of the second spindle to apply a function to the workpiece.

The lathe of the invention provides a functioning position of the functional member close to a machining position of the tool with respect to the second axis direction, which can shorten travel time of the tool post and the second spindle relatively moving between the functioning position and the machining position. This can shorten a machining cycle with the tool post.

The functional member may include the product receiver having an inlet capable of receiving a workpiece that has been machined with the tool. The inlet may be arranged in a position overlapping with at least one of the tool mounting parts of the tool post with respect to the second axis direction.

The lathe of the invention provides the relative positions of the tool post and the second spindle with respect to the second axis direction for when machining the workpiece with the tool attached to the tool mounting part overlapping or close to that for when feeding the machined workpiece into the inlet of the product receiver. This can further reduce the moving range of one or both of the tool post and the second spindle in the second axis direction. All the features described above contribute to downsizing the lathe.

The tool post may be arranged in a position separate from the first spindle axis with respect to the second axis direction. The functional member may include the product receiver having the inlet capable of receiving a workpiece that has been machined with the tool. The inlet may be arranged in a position closer to the first spindle axis with respect to the second axis direction than at least one of the tool mounting parts of the tool post.

The lathe of the invention provides the relative positions of the tool post and the second spindle with respect to the second axis direction for when machining the workpiece with the tool attached to the tool mounting part overlapping or close to that for when feeding the machined workpiece into the inlet of the product receiver. This can further reduce the moving range of one or both of the tool post and the second spindle in the second axis direction. All the features described above contribute to downsizing the lathe.

The product receiver may have a slope for guiding the received workpiece by utilizing a height difference.

A space formed below the slope may be effectively used as a place for the tool or the tool attachment unit.

A coolant nozzle may be arranged in the space formed below the slope.

At least one of the tool mounting parts may be displaced in the second axis direction with respect to the closest one among the tool mounting parts aligned at intervals in the first axis direction.

Such arrangement brings the tool mounting parts close to each other with respect to the first axis direction, which downsizes the tool post with respect to the first axis direction. Such arrangement also reduces the moving range of one or both of the tool post and the second spindle in the first axis direction, which contributes to shortening the machining time.

The invention provides a downsized lathe.

DETAILED DESCRIPTION

Figure 1:
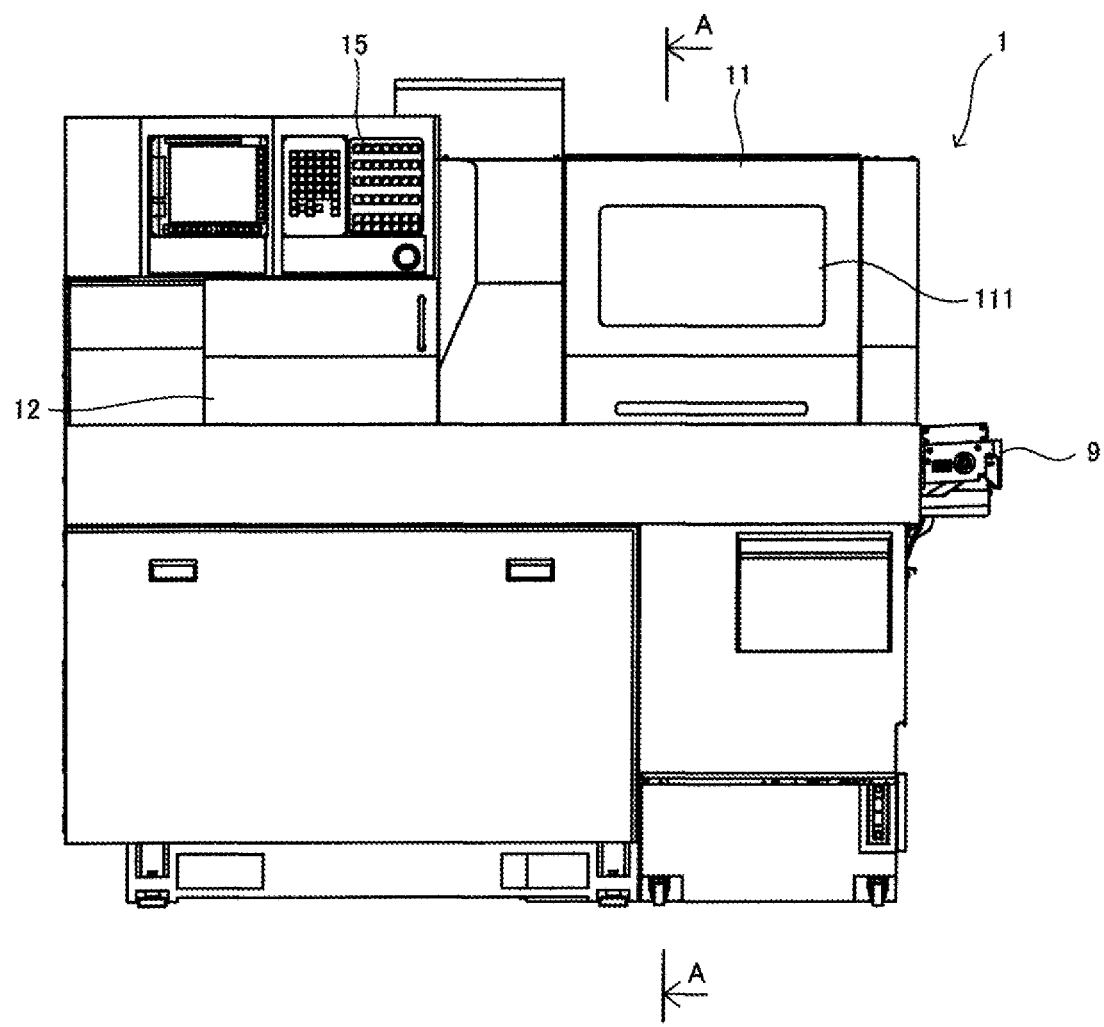
FIG. 1 is a front view showing an appearance of an NC lathe of an embodiment.

Hereinafter, an embodiment of the present invention will be described referring to the drawings. The invention embodied in an NC (Numerical Control) lathe is being described.

FIG. 1 is a front view showing the appearance of the NC lathe.

As shown in FIG. 1, an NC lathe 1 may be provided with a machining chamber 11, a first headstock chamber 12, and an operation panel 15 all mounted on a base 10 (FIG. 3). The NC lathe 1 may be an example of the lathe. FIG. 1 further shows a downstream end of a discharge conveyor 9 capable of conveying a finished product to the outside of the NC lathe 1. The machining chamber 11 may be arranged on the right side of the NC lathe 1 as seen from front. The machining chamber 11 may be provided with a window 111 on the front side of the chamber 11 through which the inside of the chamber 11 can be seen. The first headstock chamber 12 may be arranged on the left side of the NC lathe 1 as seen from front. The operation panel 15 may be arranged above the first headstock chamber 12. The operation panel 15 may be an input apparatus capable of operating the NC lathe 1. An operator of the NC lathe 1 may check an operation done in the machining chamber 11 through the window 11 and then input on the operation panel 15.

Figure 2:
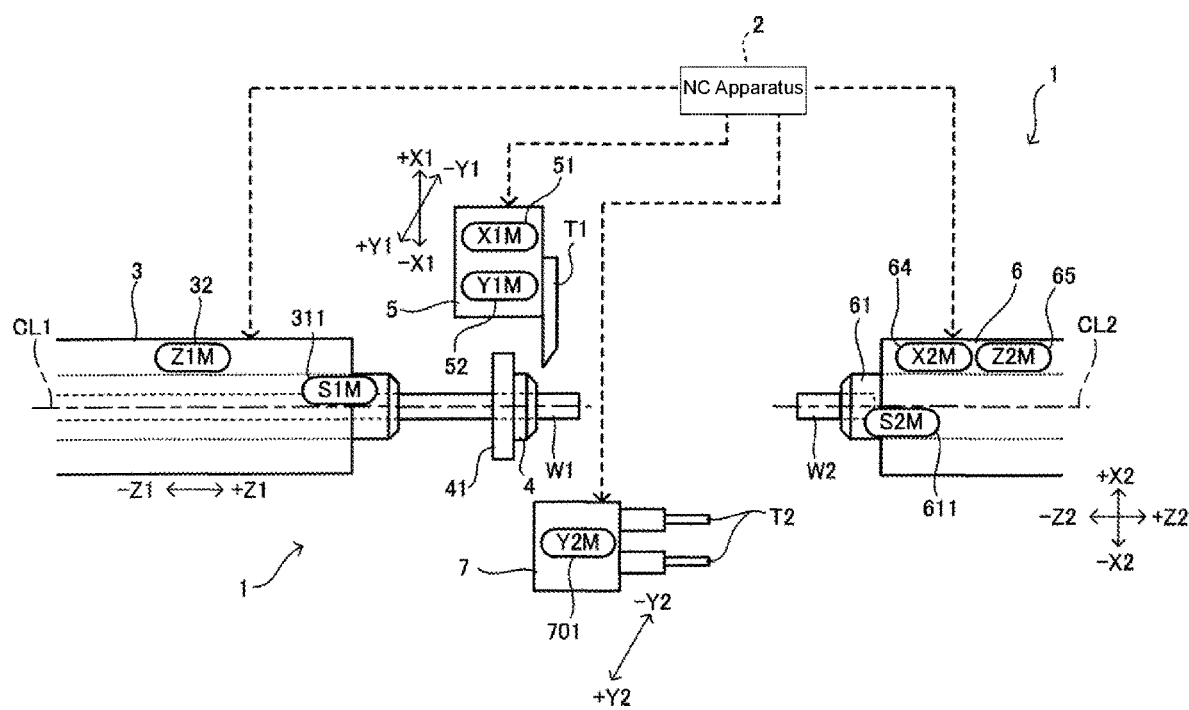
FIG. 2 is a schematic plan view of an internal configuration of the NC lathe.

FIG. 2 is a schematic plan view of an internal configuration of the NC lathe as shown in FIG. 1.

As shown in FIG. 2, the NC lathe 1 may be internally provided with an NC apparatus 2, a first headstock 3, a guide bush 4, a first tool post 5, a second headstock 6, and a second tool post 7. The NC apparatus 2 may store an NC program. The NC apparatus 2 may be a computer capable of controlling the first headstock 3, the first tool post 5, the second headstock 6, and the second tool post 7 in accordance with the NC program. The NC apparatus 2 may also control rotation of a first spindle 31 and a second spindle 61. A tool T1 including a rotary tool may be attached to the first tool post 5. A tool T2 including a rotary tool may be attached to the second tool post 7. The NC apparatus 2 may control rotation of the rotary tool. The NC apparatus 2 may control the operation of the NC lathe 1 according to an input directly given through the operation panel 15.

The first headstock 3 may be arranged inside the first headstock chamber 12 as shown in FIG. 1. The first headstock 3 may have the first spindle 31 mounted thereon. The first headstock 3 having the first spindle 31 thereon may be movable in a Z1-axis direction by rotation of a Z1-axis motor in response to a command from the NC apparatus 2. The Z1-axis direction may be a horizontal direction, which is a right-left direction in FIG. 2. The first spindle 31 may be provided with a first chuck such as a collet. A bar workpiece W1 may be inserted into the first spindle 31. The first spindle 31 may releasably hold the workpiece W1 by the first chuck. The first spindle 31 holding the workpiece W1 may be rotatable on a first spindle axis CL1. The direction of the first spindle axis CL1 may be aligned with the Z1-axis direction. The first spindle 31 may be provided with a first spindle motor 311 such as a built-in motor. The first spindle 31 may be driven by the motor 311 in response to a command from the NC apparatus 2. The workpiece W1 held by the first spindle 31 may be thereby rotatable on the first spindle axis CL1.

The guide bush 4 may be secured to a guide bush supporting bed 41 on the base 10 (FIG. 3) of the NC lathe 1. The end surface of the guide bush 4 opposite the first spindle 31 may be exposed inside the machining chamber 11 as shown in FIG. 1. The guide bush 4 may slidably support the end of the workpiece W1 inserted through the first spindle 31. The workpiece W1 may be thereby slidable in the Z1-axis direction. Part of the guide bush 4 that supports the workpiece W1 may be rotatable on the first spindle axis CL1 synchronously with the first spindle 31. The first spindle axis CL1 may be a rotational axis of the workpiece W1 supported by the guide bush 4. The guide bush 4 can suppress a bend of the workpiece W1 during machining, thereby providing higher accuracy especially for a longer workpiece.

The first tool post 5 may be movable in a horizontal X1-axis direction perpendicular to the Z1-axis direction and in a vertical Y1-axis direction perpendicular to the Z1-axis direction. The first tool post 5 may be movable in the X1-axis direction by rotation of an X1-axis motor 51 in response to a command from the NC apparatus 2. The first tool post 5 may be movable in the Y1-axis direction by rotation of a Y1-axis motor 52 in response to a command from the NC apparatus 2. The up-down direction of FIG. 2 may be the X1-axis direction and a direction perpendicular to paper may be the Y1-axis direction. The first tool post 5 may hold the tool T1 capable of machining the workpiece W1. In FIG. 2, the tool T1 is attached to the first tool post 5. The tool T1 may be placed in the machining chamber 11. The first tool post 5 may have the multiple tools T1 aligned in the Y1-axis direction including a turning tool and a cut-off tool. One of the tools T1 may be selected as the first tool post 5 moves in the Y1-axis direction. The selected tool T1 may cut in the workpiece W1 held by the first spindle 31 when the first tool post 5 moves in the X1-axis direction.

The second headstock 6 may be disposed in the machining chamber 11. The second headstock 6 may have the second spindle 61 mounted thereon. The second headstock 6 having the second spindle 61 thereon may be movable in an X2-axis direction by rotation of an X2-axis motor 64 in response to a command from the NC apparatus 2. The second headstock 6 having the second spindle 61 thereon may be movable in a Z2-axis direction by rotation of a Z2-axis motor 65 in response to a command from the NC apparatus 2. The X2-axis direction may be the same as the X1-axis direction. The Z2-axis direction may be the same as the Z1-axis direction. The second spindle 61 may be provided with a second chuck such as a collet. A cut-off workpiece W2 that has been machined with the first spindle 31 and cut off with a cut-off tool may be delivered to the second spindle 61. The cut-off workpiece W2 may be an example of the workpiece. The second spindle 61 may releasably hold the cut-off workpiece W2 by the second chuck. The second spindle 61 holding the cut-off workpiece W2 may be rotatable on a second spindle axis CL2. The direction of the second spindle axis CL2 may be aligned with the Z2-axis direction. The Z2-axis direction may be an example of the direction of the second spindle axis. The second spindle 61 may be provided with a second spindle motor 611 such as a built-in motor. The second spindle 61 may be driven by the motor 611 in response to a command from the NC apparatus 2. The cut-off workpiece W2 held by the second spindle 61 may be thereby rotatable on the second spindle axis CL2. Configuration of the second headstock 6 and the second spindle 61 is being described later.

The second tool post 7 may be arranged inside the machining chamber 11 in a position away from the first spindle axis CL1 with respect to the X2-axis direction. The second tool post 7 may be movable in a Y2-axis direction by rotation of a Y2-axis motor 701 in response to a command from the NC apparatus 2. The Y2-axis direction may be the same as the Y1-axis direction. The second tool post 7 may hold the tools T2 capable of machining the cut-off workpiece W2 held by the second spindle 61. In FIG. 2, the tool T2 is attached to the second tool post 7. The second tool post 7 may be provided with a product receiver 73 (FIG. 5) capable of receiving a product that has been finished with the tool T2. The second tool post 7 may hold plural kinds of tools T2 including a drill and an endmill. The tools T2 may be aligned in the X2-axis direction and in the Y2-axis direction though not shown in FIG. 2. One of the tools T2 may be selected by movement of the second tool post 7 in the Y2-axis direction and by movement of the second headstock 6 in the X2-axis direction. A cut end of the cut-off workpiece W2 held by the second spindle 61 may be machined as the second headstock 6 moves in the Z2-axis direction. Configuration of the second tool post 7 is being described later.

Figure 3A:
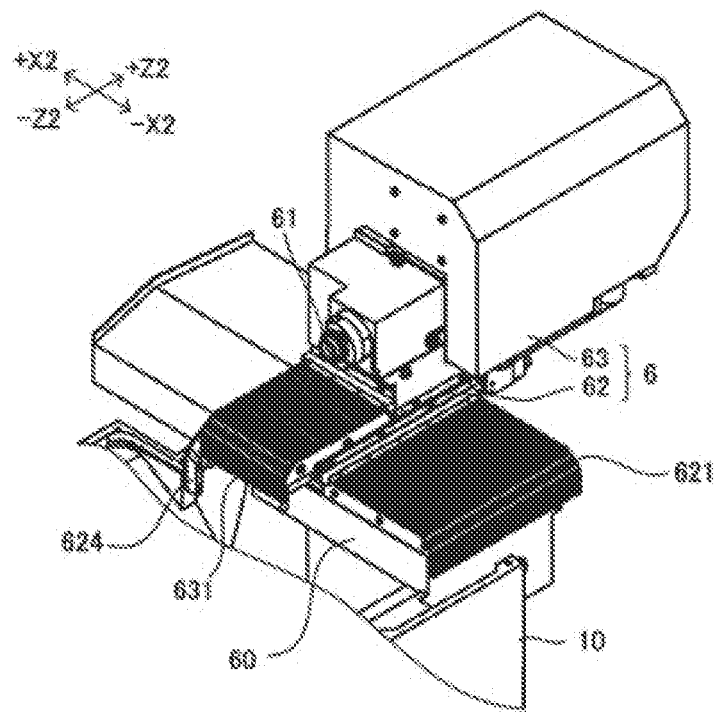
FIG. 3A is a perspective view of a second headstock and a second spindle on a second headstock base.
Figure 3B:
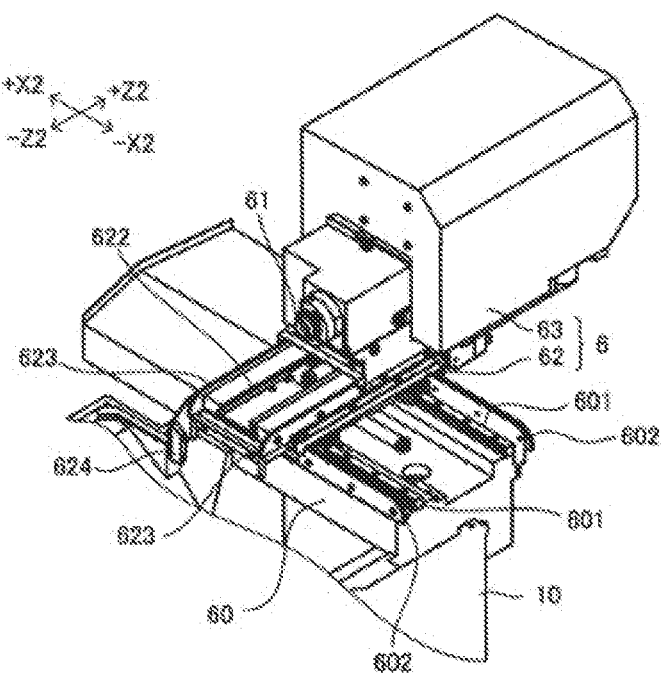
FIG. 3B is a perspective view of the second headstock and the second spindle on the second headstock base as shown in FIG. 3A after the removal of an X2 apron cover and a Z2 apron cover.

FIG. 3A is a perspective view of the second headstock and the second spindle on a second headstock base. FIG. 3B is a perspective view of the second headstock and the second spindle on the second headstock base after the removal of an X2 apron cover and a Z2 apron cover. FIG. 3A and FIG. 3B respectively shows part of the base 10.

As shown in FIG. 3A, the second headstock 6 may be mounted on the second headstock base 60 provided on the base 10. The second headstock 6 may have an X2-axis table 62 movable in the X2-axis direction and a Z2-axis table 63 mounted on the X2-axis table 62 movably in the Z2-axis direction. The X2-axis table 62 along with the second spindle 61 and the Z2-axis table 63 may move in the X2-axis direction by rotation of the X2-axis motor 64 (FIG. 2). The X2-axis direction may be an example of the second axis direction and the X2-axis motor 64 may be an example of the second driver. The X2-axis table 62 may be provided with an X2 apron cover 621. The X2 apron cover 621 may be formed of a sheet of joint-coupled multiple rectangular aluminum plates whose longer sides are extended in the Z2-axis direction. The X2 apron cover 621 may flexibly bend in a direction perpendicular to the Z2-axis direction. As shown in FIG. 3B, the second headstock base 60 may be provided with two linear motion guides 601 on which the X2-axis table 62 is mounted and two X2 cover guides 602 on which the X2 apron cover 621 is mounted. The X2 apron cover 621 may be slidably mounted on the two X2 cover guides 602. The X2 apron cover 621 may cover the linear motion guides 601 from above to prevent entry of chips and dusts into around the linear motion guides 601. The length of the X2 apron cover 621 hanging from the X2 cover guide 602 may increase as the X2-axis table 62 moves to the right lower side in FIG. 3A and FIG. 3B. The length of the X2 apron cover 621 hanging from the X2 cover guide 602 may decrease as the X2-axis table 62 moves to the left upper side in FIG. 3A and FIG. 3B.

The Z2-axis table 63 along with the second spindle 61 may move in the X2-axis direction by rotation of a not-shown Z2-axis motor. As shown in FIG. 3A, the Z2-axis table 63 may be provided with a Z2 apron cover 631. The Z2 apron cover 631 may be formed of a sheet of joint-coupled multiple rectangular aluminum plates whose longer sides are extended in the X2-axis direction. The X2 apron cover 621 may flexibly bend in a direction perpendicular to the X2-axis direction. As shown in FIG. 3B, the X2-axis table 62 may be provided with a dovetail groove 622 along which the Z2-axis table 63 moves in the Z2-axis direction and two Z2 cover guides 623 on which the Z2 apron cover 631 is mounted. The Z2 apron cover 631 may be slidably mounted on the two Z2 cover guides 623. The Z2 apron cover 631 may cover the dovetail groove 622 from above to prevent entry of chips and dusts into around the dovetail groove 622. The length of the Z2 apron cover 631 hanging from the Z2 cover guide 623 may increase as the Z2-axis table 63 moves to the left lower side in FIG. 3A and FIG. 3B. The length of the Z2 apron cover 631 hanging from the Z2 cover guide 623 may decrease as the Z2-axis table 63 moves to the right upper side in FIG. 3A and FIG. 3B.

The Z2-axis table 63 may repeat reciprocation in the Z2-axis direction as the workpiece W2 held by the second spindle 61 is under machining (FIG. 2). There is a bouncing risk of the Z2 apron cover 631 by periodic movement of the Z2-axis table 63 at speed in the Z2-axis direction. The machining point is near the Z2 apron cover 631. Bouncing of the Z2 apron cover 631 would permit undesired entry of chips into the inside of the cover 631 where the dovetail groove 622 is provided. The second headstock 6 of the embodiment may be provided with a bounce stopper 624 in a position facing the Z2 apron cover 631 to prevent bouncing of an upper hanging portion of the Z2 apron cover 631. The bounce stopper 624 may be a plate secured to an end of a protrusion projecting from the X2-axis table 62 toward the guide bush 4 (FIG. 2). The bounce stopper 624 may have a surface facing a direction perpendicular to the Z-axis direction. Bouncing part of the Z2 apron cover 631 would collide with the bounce stopper 624, which can stop bouncing of the Z2 apron cover 631. In the embodiment, the bounce stopper 624 may be provided on the protrusion of the second headstock 6. A comparative example provides the bounce stopper 624 provided on another member such as the second tool post 7 and projecting toward the Z2 apron cover 631. The embodiment can shorten the length of projection, thereby increasing rigidly and decreasing the cost. Furthermore, the embodiment can effectively reduce a risk of interference with another moving member such as the first tool post 5. Furthermore, relative positions of the Z2 apron cover 631 and the bounce stopper 624 provided on the X2-axis table 62 would not vary regardless of movement of the second headstock 6 in the X2-axis direction. This prevents bouncing of the Z2 apron cover 631 by the bounce stopper 624 regardless of the X2-axis position of the second headstock 6.

Figure 4:
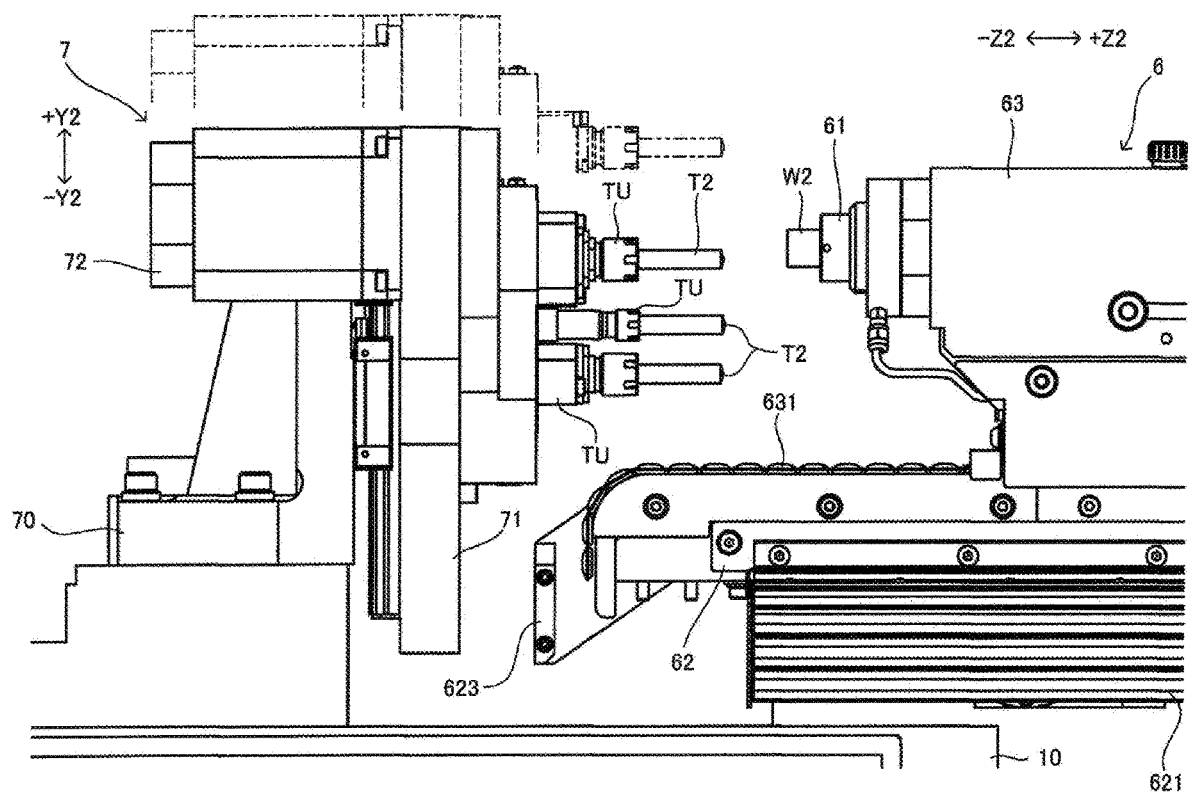
FIG. 4 is a front view as seen from front of the NC lathe showing the second headstock and a second tool post as shown in FIG. 2.

FIG. 4 is a front view as seen from front of the NC lathe showing the second headstock and the second tool post of FIG. 2.

The second headstock 6 on the X2-axis table 62 may move in the X2-axis direction to bring the second spindle 61 to a position facing the first spindle 31 (FIG. 2) and alternatively to a position facing the second tool post 7. FIG. 4 shows that the second headstock 6 has moved from the position facing the first spindle 31 to this side of paper to bring the second spindle 61 to the position facing the second tool post 7. The second tool post 7 may be mounted on a second tool post base 70 secured to the base 10. The second tool post 7 may be an example of the tool post. On the second tool post base 70, a Y2-axis motor 701 is mounted (FIG. 2). The Y2-axis motor 701 may be an example of the first driver. The second tool post 7 may be provided with a Y2-axis tool table 71 movable in the Y2-axis direction, a rotary tool motor 72 mounted on the Y2-axis tool table 71, the product receiver 73 (FIG. 5) mounted on the Y2-axis tool table 71, and a coolant nozzle 74 (FIG. 7). The product receiver 73 and the coolant nozzle 74 are not shown in FIG. 4. A tool attachment unit TU holding the tool T2 may be attached to the second tool post 7. In FIG. 4, the tool attachment TU holding the tool T2 is attached to the second tool post 7. The Y2-axis motor 701 may drive the Y2-axis tool table 71 in the Y2-axis direction along with the rotary tool motor 72 and the tool attachment unit TU holding the tool T2. The Y2-axis direction may be an example of the first axis direction. A double-dashed line in FIG. 4 shows upper part of the the Y2-axis tool table 71, the rotary tool motor 72, and the tool attachment unit TU holding the tool T2 that has moved upwards. On the second tool post 7, the multiple tools T2 may be attached at intervals in the X2-axis and Y2-axis directions. One of the tools T2 may be selected by movement of the second headstock 6 in the X2-axis direction and by movement of the second tool post 7 in the Y2-axis direction. Furthermore, the cut-end portion of the cut-off workpiece W2 held by the second spindle 61 may be machined mainly by movement of the second spindle 61 in the Z2-axis direction. Some kinds of machining may further need movement of the second spindle 61 in the X2-axis direction and movement of the second tool post 7 in the Y2-axis direction.

Figure 5:
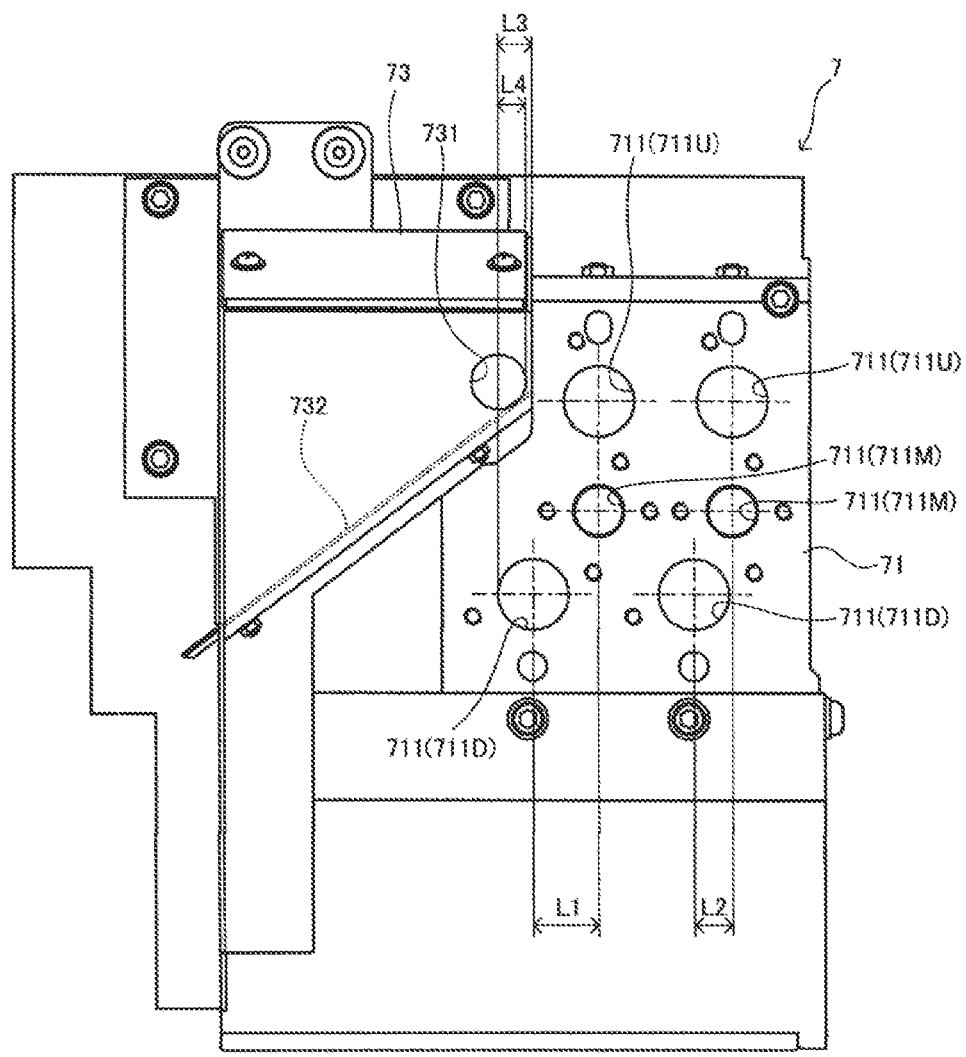
FIG. 5 is a side view of the second tool post as seen from right in FIG. 4.

FIG. 5 is a side view of the second tool post as seen from right in FIG. 4, showing the state before the tool attachment unit TU holding the tool T2 is attached. The coolant nozzle 74 (FIG. 7) is not shown.

The product receiver 73 may be mounted on the side of a side surface of the Y2-axis tool table 71 facing the second spindle 61 (FIG. 2). On the side surface of the Y2-axis tool table 71 facing the second spindle 61, there may be formed six tool mounting parts 711 in a position on the rear side of the NC lathe 1 (on the side toward the first spindle axis CL1 in FIG. 2). The tool mounting part 711 may be an example of the mounting part. The tool mounting part 711 may be a hole into which the tool T2 (FIG. 4) is attached by using the tool attachment unit TU (FIG. 4). The tool mounting part 711 of the second tool post 7 may decide the position of the tool T2 and the tool attachment unit TU on the second tool post 7. The tool mounting part 711 may be a positioning guide for the tool T2 and the tool attachment unit TU. The tool T2 may include a drill or an endmill whose axis extends in the Z2-axis direction. On the XY plane perpendicular to the Z2-axis, the center of the tool attachment unit TU and the tool T2 may usually match the center of the tool mounting part 711. Two each of the tool mounting parts 711 may be aligned side by side in the X2-axis direction. The pairs of the tool mounting parts 711 may be vertically aligned at intervals in the Y2-axis direction. The six tool mounting parts 711 may include a pair of upper mounting parts 711U, a pair of middle mounting parts 711M, and a pair of lower mounting parts 711D. The tool attachment unit TU may be attached to the tool mounting parts 711 each. Furthermore, the Y2-axis tool table 71 may include a built-in drive transmission mechanism (not shown) capable of transmitting rotation of the rotary tool motor 72. The tool attachment unit TU provided with a rotation mechanism to be engaged with the drive transmission mechanism may be attached to the upper mounting parts 711U each and the lower mounting parts 711D each. The tool T2 held by such tool attachment unit TU attached to the upper mounting parts 711U each and the lower mounting parts 711D each can serve as a rotary tool.

The upper mounting parts 711U and the middle mounting parts 711M may be arranged side by side in the X2-axis and Y2-axis directions each. In other words, the upper mounting parts 711U and the middle mounting parts 711M may be placed in positions corresponding to the four vertexes of a rectangle in the XY plane. The lower mounting parts 711D may be displaced in the X2-axis direction with respect to the upper mounting parts 711U and the middle mounting parts 711M. In FIG. 5, the lower mounting part 711D on the left side is displaced by a distance L1 toward the product receiver 73 with respect to the middle mounting part 711M on the left side. In other words, the lower mounting part 711D on the left side is displaced by the distance L1 in the X2-axis direction with respect to the closest mounting part 711 (the middle mounting part 711M on the left side) among the tool mounting parts 711 aligned at intervals in the Y2-axis direction. In FIG. 5, the lower mounting part 711D on the right side is displaced by a distance L2 toward the product receiver 73 with respect to the middle mounting part 711M on the right side. Such displacement provides close arrangement of the middle mounting parts 711M and the lower mounting parts 711D in the Y2-axis direction, which shortens the length of the second tool post 7 in the Y2-axis direction and thereby reduces the size of the second tool post 7. Furthermore, their close arrangement shortens the moving distance of the second tool post 7 in the Y2-axis direction and thereby reduces machining time. Furthermore, in FIG. 5, the lower mounting part 711D on the left side is arranged in a position overlapping the product receiver 73 in the X2-axis direction by a distance L3 and also overlapping an inlet 731 of the product receiver 73 in the X2-axis direction by a distance L4.

The product receiver 73 may be mounted on the second tool post 7 in a position on the front side of the NC lathe 1. The product receiver 73 may be an example of the functional member. The product receiver 73 may include the inlet 731 into which a finished workpiece is received and a slope 732 along which the received workpiece slides down. Upon completion of machining with the second spindle 61, the second headstock 6 may move in the X2-axis direction and the second tool post 7 may move in the Y2-axis direction. The second spindle 61 may thereby be brought to a position facing the product receiver 73 in the Z2-axis direction. Specifically, the finished workpiece held by the second spindle 61 may be brought to a position facing the inlet 731 in the Z2-axis direction. Then, the second headstock 6 may move in the Z2-axis direction to insert an end of the finished workpiece exposed from the second spindle 61 into inside the product receiver 73. Then, the second spindle 61 may open the chuck and push the workpiece out from the second spindle 61. The finished product may fall into inside the product receiver 73 and roll on the slope 732 downwards (toward lower left in FIG. 5). The finished product may be carried by the conveyor 9 (FIG. 6) to be discharged outside the NC lathe 1.

Figure 6:
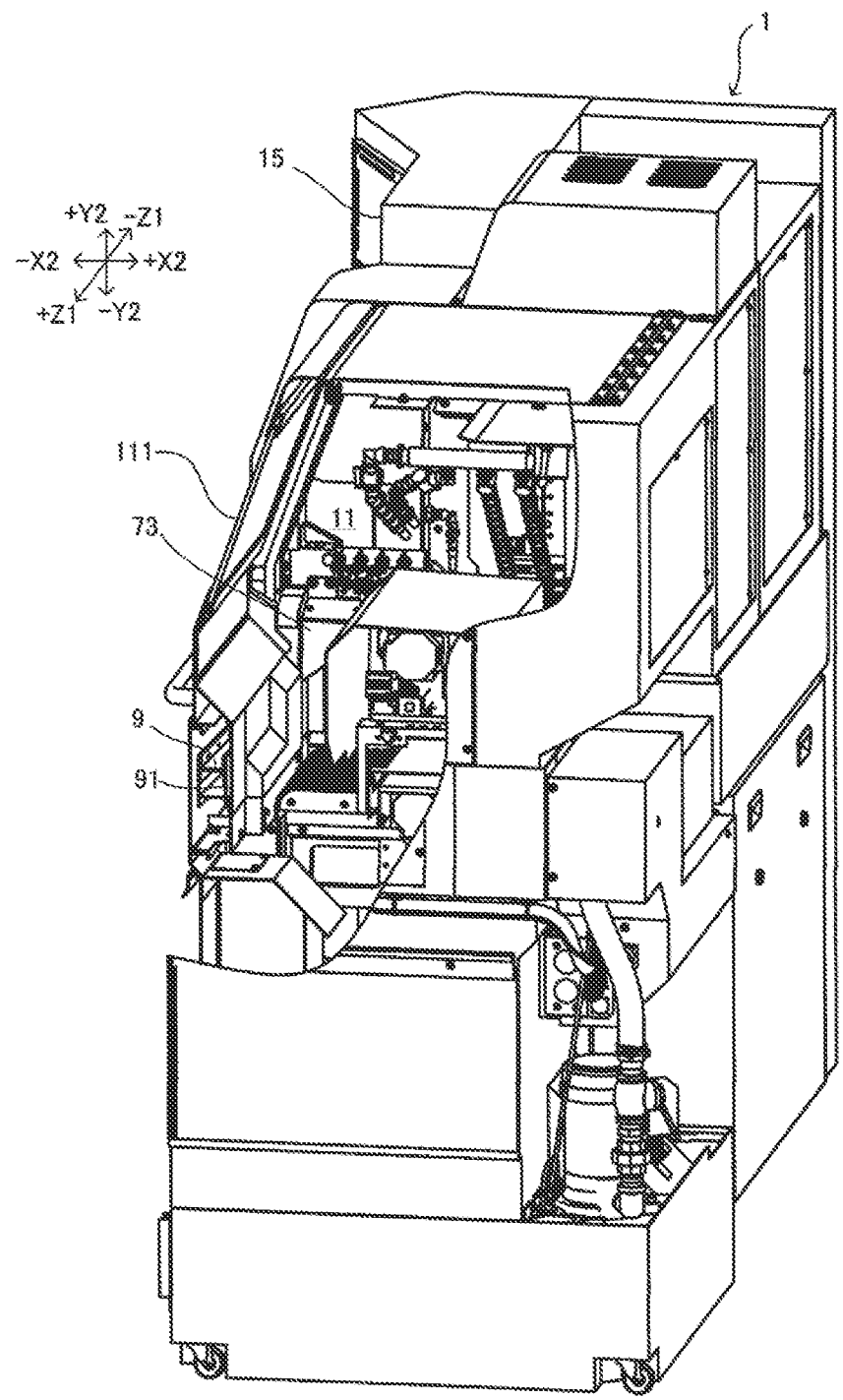
FIG. 6 is a perspective view of the partially cut NC lathe as seen from right rear side.

FIG. 6 is a perspective view of the partially cut NC lathe as seen from right rear side.

The conveyor 9 may extend in the Z-axis direction in a position on the front side of the NC lathe 1. The finished workpiece rolling on the slope 732 may land on the conveyor 9 to be carried to the downstream end thereof as shown in FIG. 1. The conveyor 9 may be separated by a partition wall 91 from the machining chamber 11. The conveyor 9 may be enclosed in a chamber separated from the machining chamber 11 where a large amount of coolant is used and cutting chips are scattered. For the conveyor 9 without such partition wall, coolant and chips landing on the conveyor 9 could leak outside the NC lathe 1 as the finished workpieces are conveyed. The embodiment provides the partition wall 91 capable of preventing landing of coolant and chips on the conveyor 9. Instead of the conveyor 9, another discharging apparatus such as a stocker may be used to store the finished workpieces fallen by own weight. The partition wall 91 may be also effective for such apparatus to prevent entry of coolant and chips.

Figure 7A:
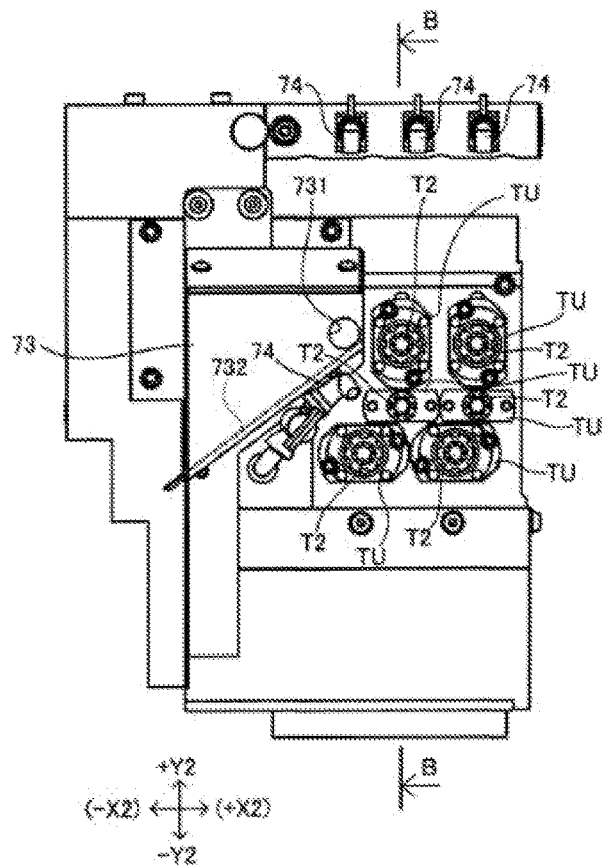
FIG. 7A is a side view similar to FIG. 5 showing the second tool post provided with the coolant nozzle and the tool attachment unit.
Figure 7B:
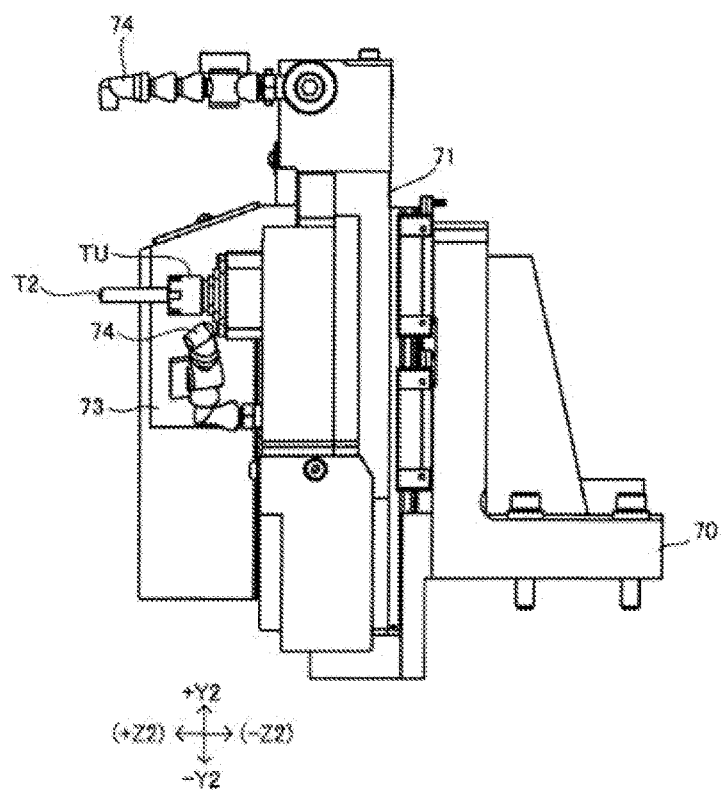
FIG. 7B is a B-B line section view of FIG. 7A.

FIG. 7A is a side view similar to FIG. 5 showing the second tool post provided with the coolant nozzle and the tool attachment unit. FIG. 7B is a B-B line section view of FIG. 7A. FIG. 7B does not show the tool T2 and the tool attachment unit TU attached to the middle mounting parts 711M and the lower mounting parts 711D. The built-in drive transmission mechanism of the Y2-axis tool table 71 is also not shown. Sections in FIG. 7B are shown without hatching.

The tool attachment unit TU may include a base part in contact with a surface of the Y2-axis tool table 71. The base part may have a shape of almost oval or rectangle as shown in FIG. 7A. For the tool attachment unit TU attached to the upper mounting part 711U (FIG. 5), the direction of a long side of the base part may match with the Y2-axis direction. For the tool attachment unit TU attached to the middle mounting part 711M (FIG. 5) and the lower mounting part 711D (FIG. 5), the direction of the long side of the base part may match with the X2-axis direction. Such arrangement allows close positioning of the tools T2 in the Y2-axis direction, thereby shortening a movement stroke of the second tool post 7 in the Y2-axis direction. This also shortens the length of the second tool post 7 in the Y2-axis direction. The upper mounting part 711U may have a cross drill unit holding the tool T2 capable of drilling in the Y2-axis direction. The cross drill unit, specifically the base part thereof is subject to rotational moment around the X2-axis direction. For the tool attachment unit TU attached to the upper mounting part 711U, the direction of the long side of the base part may desirably match with the Y2-axis direction. This allows the base part to effectively receive rotational moment. The product receiver 73 projecting toward the upper mounting part 711U reduces the width with respect to the X2-axis direction around the upper mounting part 711U. For the plural tool attachment units TU attached to the narrower space, the direction of the long side of the base part may desirably match with the Y2-axis direction.

The second tool post 7 may be provided with the four coolant nozzles 74. Three of them may be arranged above the product receiver 73 and the tool attachment units TU. The other one may be arranged below the slope 732 of the product receiver 73. As shown in FIG. 7B, the product receiver 73 may largely project in the Z2-axis direction from the Y2-axis tool table 71. As shown in FIG. 7A, the tool attachment unit TU on the lower left side may be in a position overlapping the product receiver 73 in the X2-axis direction. The tool T2 held by the tool attachment unit TU on the lower left side is hardly supplied with coolant fluid poured from the above three nozzles 74 except the leading end projecting in the Z2-axis direction beyond the product receiver 73. The embodiment provides a single nozzle in a space below the product receiver 73. This allows supply of enough coolant fluid to the tool T2 overlapping with the product receiver 73 in the X2-axis direction without increasing the size of the machine.

In a comparative example, the product receiver 73 may be secured, for example, to the base 10 (FIG. 4) instead of the second tool post 7. The product receiver 73 on the base 10, however, must be in such position as not interfering the moving range of the second tool post 7. This needs a configuration allowing the second spindle 61 to move a long distance in the X2-axis direction in which the product receiver 73 and the second tool post 7 are aligned. The embodiment, however, eliminates such need by providing the product receiver 73 on the second tool post 7. Furthermore, the tool mounting part 711 on lower left in FIG. 5 may be arranged in a position overlapping the product receiver 73 with respect to the X2-axis direction. This can shorten the length of the second tool post 7 with respect to the X2-axis direction. The position of the second spindle 61 machining the workpiece W2 with the tool T2 attached to the tool mounting part 711 on lower left may overlap or be close to the position of the second spindle 61 using the product receiver 73 with respect to the X2-axis direction. This can further reduce the moving range of the second spindle 61 in the X2-axis direction. All the features described above contribute to downsizing the NC lathe 1. This further contributes to reducing the cost. Furthermore, the embodiment provides a functioning position of the product receiver 73 close to a machining position of the tool T2 with respect to the X2-axis direction, which can shorten travel time of the second tool post 7 and the second spindle 61 relatively moving between the functioning position and the machining position. This can shorten a machining cycle with the second tool post 7. Furthermore, the tool mounting part 711 on lower left in FIG. 5 may be formed in the space below the slope 732 of the product receiver 73. This effectively use the space to hold the tool attachment unit TU.

A modified embodiment of the second tool post 7 is being described. The same symbol is being used for the same element. Repeated description is being excluded.

Figure 8:
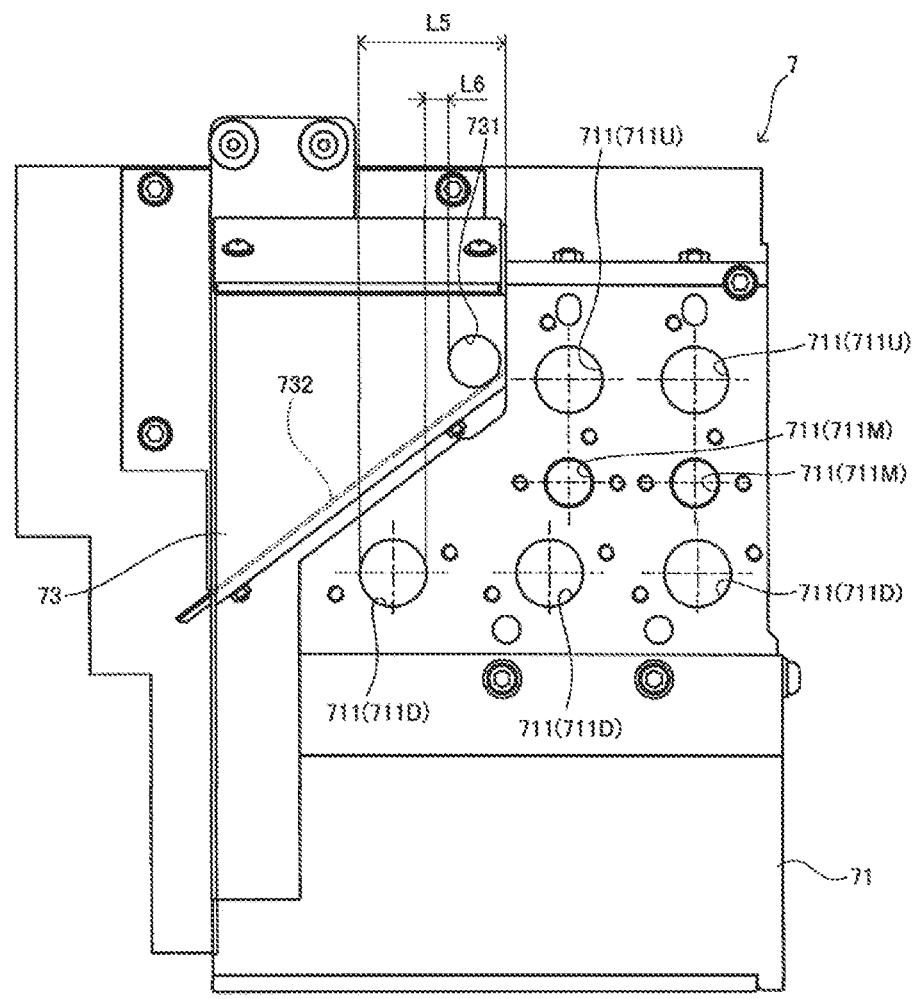
FIG. 8 is a side view similar to FIG. 5 showing a modified embodiment of the second tool post.

FIG. 8 is a side view similar to FIG. 5 showing the modified embodiment of the second tool post.

The second tool post 7 in FIG. 8 differs from FIG. 5 in that the three lower mounting parts 711D may be provided. The middle and right mounting parts 711D may be formed in a position on the further rear side of the NC lathe 1 than the product receiver 73 with respect to the X2-axis direction. The left mounting part 711D may entirely overlap the product receiver 73 with respect to the X2-axis direction. The left mounting part 711D may be in a position displaced toward the front side of the NC lathe 1 by a distance L5 or apart from the product receiver 73 by a distance L6 on the further front side of the NC lathe 1 than the product receiver 73 with respect to the X2-axis direction. The inlet 731 of the product receiver 73 may be closer to the first spindle axis CL1 (FIG. 2) with respect to the X2-axis direction than the tool mounting part 711 on lower left in FIG. 5.

The modified embodiment also provides the similar effects as the embodiment described above. An increase in the number of tools T2 attachable to the second tool post 7 provides more variety of operations. Furthermore, the position of the second spindle 61 using the product receiver 73 may be within the moving range of the second spindle 61 finishing the workpiece W2 with respect to the X2-axis direction. This eliminates the need of expanding the moving range of the second spindle 61 with respect to the X2-axis direction to cover the position using the product receiver 73.

The invention may be embodied in a variety of modifications within a range of the claims. The second headstock 6 along with the second spindle 61 may move in the X2-axis direction. Instead, the second tool post 7 may move in the X2-axis direction. Furthermore, the second tool post 7 may move in the X2-axis direction independently of the second headstock 6 moving in the X2-axis direction. A motor capable of driving the second tool post 7 in the X2-axis direction may be an example of the second driver. Similarly, the second headstock 6 may move in the Y2-axis direction instead of the second tool post 7. Furthermore, the second headstock 6 may move in the Y2-axis direction independently of the second tool post 7 moving in the Y2-axis direction. A motor capable of driving the second headstock 6 in the Y2-axis direction may be an example of the first driver. Furthermore, the product receiver 73 provided on the second tool post 7 may be replaced by a measuring apparatus capable of measuring the shape of the machined workpiece, a robot arm capable of receiving the machined workpiece, or a breakage detector capable of detecting breakage of the tools T1 and T2. The measuring apparatus, the robot arm, and the breakage detector each may be an example of the functional member. The product receiver, the measuring apparatus, the robot arm, and the breakage detector each may apply function to the workpiece before or after machining. The two tool mounting parts 711 may or may not be aligned side by side in the X2-axis direction. The three or more tool mounting parts 711 may be aligned side by side in the X2-axis direction. The embodiment provides the upper, middle, and lower mounting parts 711 in the Y2-axis direction. The tool mounting parts 711 may include only the upper and lower mounting parts or more in the Y2-axis direction. The embodiment provides the NC lathe 1 whose X2-axis direction is horizontal and Y2-axis direction is vertical. The NC lathe may be replaced by another NC lathe whose X2-axis direction is angled with respect to the horizontal direction and Y2-axis direction is angled with respect to the vertical direction. In such NC lathe of slant structure, the X2-axis direction, the Y2-axis direction, and the Z2-axis direction may be perpendicular to each other. The X1-axis direction may be vertical and the Y1-axis direction may be horizontal.

Any element included only in the specific embodiment as described above may be applied to any other modification.

What is claimed is:

1. A lathe comprising:
   a first spindle rotatable on a first spindle axis;
   a second spindle rotatable on a second spindle axis and configured to hold a workpiece delivered from the first spindle;
   a tool post on which a plurality of tools are attachable, the tools configured to machine the workpiece held by the second spindle;
   a product receiver provided on the tool post, the product receiver comprising an inlet and a slope inside the product receiver, wherein the inlet is configured to receive the workpiece that has been machined with at least one of the plurality of the tools, and wherein the slope is configured to be used for workpiece discharge after machining, by having the workpiece fall into the slope inside the produce receiver, and guiding the workpiece to roll downwards to be discharged;
   a first driver configured to move at least one of the tool post and the second spindle in a first axis direction perpendicular to a direction of the second spindle axis; and
   a second driver configured to longitudinally move at least one of the tool post and the second spindle along a second axis direction, perpendicular to the direction of the second spindle axis and also perpendicular to the first axis direction;
   wherein the tool post has a plurality of mounting parts where the tools are attachable,
   the plurality of mounting parts are aligned at intervals in the first axis direction, and
   a first mounting part of the plurality of mounting parts is at least partially under the product receiver or over the product receiver.

2. The lathe of claim 1, wherein the first driver moves the tool post.

3. The lathe of claim 1, wherein the product receiver faces the second spindle with respect to the direction of the second spindle axis.

4. The lathe of claim 2, wherein the product receiver faces the second spindle with respect to the direction of the second spindle axis to.

5. The lathe of claim 1, wherein the first mounting part of the plurality of mounting parts is at least partially under the inlet of the product receiver or over the inlet of the product receiver.

6. The lathe of claim 2, wherein the first mounting part of the plurality of mounting parts is at least partially under the inlet of the product receiver or over the inlet of the product receiver.

7. The lathe of claim 3, wherein the first mounting part of the plurality of mounting parts is at least partially under the inlet of the product receiver or over the inlet of the product receiver.

8. The lathe of claim 4, wherein the first mounting part of the plurality of mounting parts is at least partially under the inlet of the product receiver or over the inlet of the product receiver.

9. The lathe of of claim 1, wherein the tool post is separate from the first spindle axis with respect to the second axis direction, the inlet is closer to the first spindle axis with respect to the second axis direction than a second mounting part of the plurality of mounting parts.

10. The lathe of of claim 2, wherein the tool post is separate from the first spindle axis with respect to the second axis direction, the inlet is closer to the first spindle axis with respect to the second axis direction than a second mounting part of the plurality of mounting parts.

11. The lathe of of claim 3, wherein the tool post is separate from the first spindle axis with respect to the second axis direction, the inlet is closer to the first spindle axis with respect to the second axis direction than a second mounting part of the plurality of mounting parts.

12. The lathe of of claim 4, wherein the tool post is separate from the first spindle axis with respect to the second axis direction, the inlet is closer to the first spindle axis with respect to the second axis direction than a second mounting part of the plurality of mounting parts.

13. The lathe of claim 5, wherein the first mounting part of the plurality of mounting parts is positioned apart from a third mounting part of the plurality of mounting parts, which is closest to the first mounting part of the plurality of mounting parts, in both the first axis direction and the second axis direction.

14. The lathe of claim 7, wherein the first mounting part of the plurality of mounting parts is positioned apart from a third mounting part of the plurality of mounting parts, which is closest to the first mounting part of the plurality of mounting parts, in both the first axis direction and the second axis direction.

15. The lathe of claim 9, wherein the first mounting part of the plurality of mounting parts is positioned apart from a third mounting part of the plurality of mounting parts, which is closest to the first mounting part of the plurality of mounting parts, in both the first axis direction and the second axis direction.

16. The lathe of claim 11, wherein the first mounting part of the plurality of mounting parts is positioned apart from a third mounting part of the plurality of mounting parts, which is closest to the first mounting part of the plurality of mounting parts, in both the first axis direction and the second axis direction.

* * * * *